United States Patent [19]
Kanbara et al.

[11] Patent Number: 6,023,964
[45] Date of Patent: Feb. 15, 2000

[54] MISFIRE DIAGNOSIS METHOD AND APPARATUS OF INTERNAL COMBUSTION ENGINE

[75] Inventors: Yutaka Kanbara; Akira Uchikawa, both of Atsugi, Japan

[73] Assignee: Unisia Jecs Corporation, Atsugi, Japan

[21] Appl. No.: 09/037,026

[22] Filed: Mar. 9, 1998

[30]     Foreign Application Priority Data

Mar. 19, 1997  [JP]  Japan ................................. 9-065854

[51] Int. Cl.[7] ...................................................... G01L 3/26
[52] U.S. Cl. .......................... 73/117.3; 73/116; 73/117.2; 701/110
[58] Field of Search ................... 73/117.3, 116, 73/117.2; 701/110

[56]              References Cited

U.S. PATENT DOCUMENTS

| 5,044,195 | 9/1991  | James et al. ...................... 73/117.3 |
| 5,287,737 | 2/1994  | Asawa et al. ..................... 73/117.3 |
| 5,301,546 | 4/1994  | Inada et al. ...................... 73/117.3 |
| 5,728,941 | 3/1998  | Yamamoto et al. ............... 73/117.3 |
| 5,747,681 | 5/1998  | Kuroda et al. ................... 73/117.3 |
| 5,832,404 | 11/1998 | Amano .............................. 73/117.3 |
| 5,906,651 | 5/1999  | Amano .............................. 73/117.3 |

FOREIGN PATENT DOCUMENTS 5-17172  3/1993  Japan .

*Primary Examiner*—William Oen
*Attorney, Agent, or Firm*—Foley & Lardner

[57]                ABSTRACT

The present invention relates to an apparatus for diagnosing misfire of an internal combustion engine. With this invention, crank angle intervals for detecting angular velocity for each cylinder are variably set for each operation region. An average value of a predetermined number of misfire judgment values M1 set based on a plurality of angular velocities is compared with a reference value, to thereby carry out misfire diagnosis distinguishably of a misfire in a single cylinder or misfires in multiple cylinders.

6 Claims, 5 Drawing Sheets

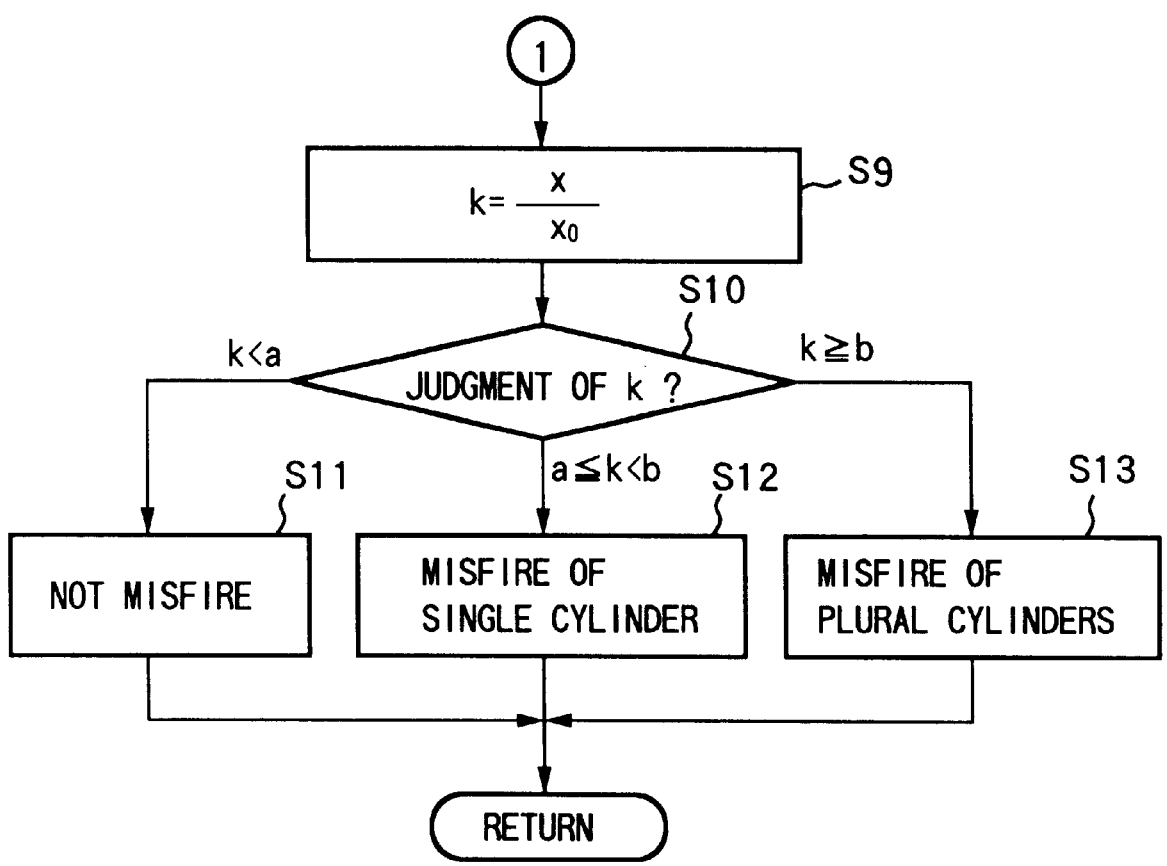

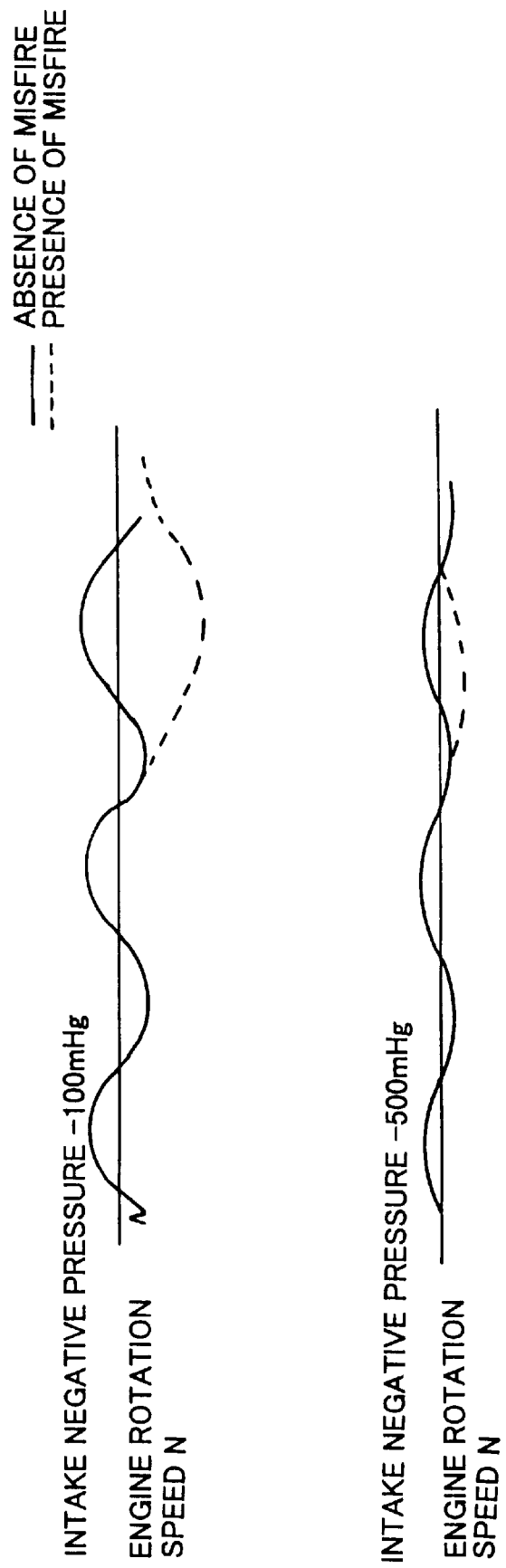

MISFIRE DIAGNOSIS METHOD AND APPARATUS OF INTERNAL COMBUSTION ENGINE

BACKGROUND OF THE INVENTION

1. Field of the Invention

The present invention relates to a method and an apparatus for diagnosing occurrence of misfire in an internal combustion engine.

2. Related art of the Invention

There has been conventionally proposed a misfire diagnosing apparatus for an internal combustion engine, in which the occurrence of misfire is judged based on periods of reference signals which are generated by a crank angle sensor at each crank angle 720°/n (n: number of cylinders) and are successively detected, and in response to fluctuation status of these periods (see Japanese Unexamined Utility Model Publication No.5-17172).

However, in such a case that the misfire diagnosis is performed in response to the fluctuation states of periods (angular speed) of the reference signals, there may have been erroneously detected such as particularly in a higher rotation and less load region in which the fluctuation of engine combustion rarely appears so that the misfire of a single cylinder and that of a plurality of cylinders cannot be distinguished from each other.

SUMMARY OF THE INVENTION

The present invention has been carried out in view of the conventional problems as described above, and it is therefore an object of the present invention to diagnose misfire of a single cylinder and that of a plurality of cylinders in an internal combustion engine, in a clearly distinguished manner.

Therefore, the present invention provides a misfire diagnosis method for an internal combustion engine, comprising the steps of detecting an angular speed of rotation for each of predetermined crank angle intervals corresponding to each of cylinders, respectively, detecting an engine driving state to thereby variably set the crank angle intervals for detecting an angular speed, for each of driving ranges corresponding to each of the detected engine driving states, respectively, calculating a misfire judgment value based on a detected value of angular speed for each of predetermined crank angles corresponding to each of cylinders, respectively, summing the misfire judgment value at each calculation, and diagnosing presence and absence of misfire in a manner distinguishing misfire of a single cylinder from that of a plurality of cylinders, by comparing a summed or averaged value of the misfire judgment value with a reference value.

Further, the present invention provides a misfire diagnosis apparatus for an internal combustion engine, comprising an angular speed detecting device for detecting an angular speed of rotation for each of predetermined crank angle intervals corresponding to each of cylinders, respectively, a driving state detecting device for detecting an engine driving state, a detection interval setting device for variably setting the crank angle intervals for detecting an angular speed, for each of driving ranges corresponding to each of the detected engine driving states, respectively, a misfire judgment value calculating device for calculating a misfire judgment value based on a detected value of angular speed for each of predetermined crank angles corresponding to each of cylinders, respectively, misfire judgment value summing device for summing the misfire judgment value at each calculation, and a misfire diagnosing device for diagnosing presence or absence of misfire in a manner distinguishing misfire of a single cylinder from that of a plurality of cylinders, by comparing a summed or averaged value of the misfire judgment value with a reference value.

According to such a constitution, the precision in detecting an angular speed is improved, by varying each of the intervals for measuring the crank angle, for each of driving ranges, respectively, to an interval which is appropriate for detecting the angular speed, since the crank angle intervals appropriate for measuring an angular speed for each cylinders are different for each driving ranges having different combustion characteristics, respectively.

Further, the misfire judgment value is summed, so that the summed value (or averaged value) can be varied substantially in proportion to the number of misfired cylinders, which is single or a plural. Thus, by comparing this summed value (or averaged value) with a reference value, misfire judgment can be performed in a manner clearly distinguishing misfire of a single cylinder from that of a plurality of cylinders.

Each of the crank angle intervals may be variably set, for example, such that each of the crank angle intervals is set to be narrower in a higher rotational range, and is set to be wider in a lower rotational range.

According to such a constitution, the precision in detecting an angular speed in respective ranges can be improved, in that each of the crank angle intervals is set to be narrower in a higher rotational range, since the oscillation in the torsional direction of crank angle is large in such a state so that the difference between the angular "speeds" for misfire and non-misfire is large; and conversely, each of the crank angle intervals is set to be wider in a lower rotational range, since the oscillation in the torsional direction of crank angle is small in such a state so that the difference between the angular "speeds" for misfire and non-misfire is small.

The detection of the angular speed may be performed such as by detecting each of periods for each of the predetermined crank angles, respectively, as an inverse number of an angular speed corresponding to each of cylinders.

According to such a constitution, there can be expediently measured a value corresponding to the angular speed, by a timer, so that the calculation therefor can be omitted.

BRIEF EXPLANATION OF THE DRAWINGS

FIG. 4 is a flow chart showing a latter part of the misfire diagnosis routine; and FIG. 5 is a time chart showing fluctuation states of rotations at different engine loads.

PREFERRED EMBODIMENT

Figure 1:
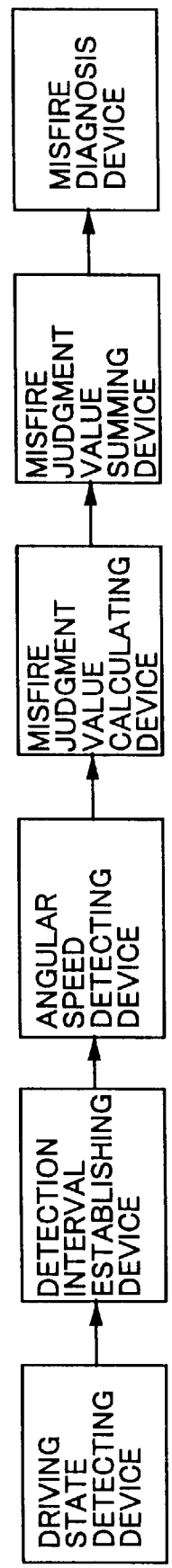
FIG. 1 is a block diagram showing a constitution and a function of the present invention.

The constitution and function of the present invention will be explained hereinafter, with reference to the block diagram of FIG. 1.

Firstly detected by an angular speed detecting device is an angular speed of rotation for a predetermined crank angle interval which corresponds to each of cylinders.

There is detected an engine driving state, by a driving state detecting device.

The crank angle intervals for detecting the angular speed are variably set by a detection interval establishing device, for each of driving range corresponding to the above detected engine driving state, respectively.

Based on the detected angular speed value, there is calculated a misfire judgment value by a misfire judgment value calculating device, for each of predetermined crank angles corresponding to each of the cylinders, respectively.

The misfire judgment value is summed up by a misfire judgment value summing device, at each calculation of the misfire judgment value.

A misfire diagnosis device diagnoses an occurrence of misfire, by comparing the summed value or averaged value of the misfire judgment value with a reference value, while distinguishing misfire of a single cylinder from that of a plurality of cylinders.

There will be explained hereinafter the embodiment of the present invention with reference to the accompanying drawings.

Figure 2:
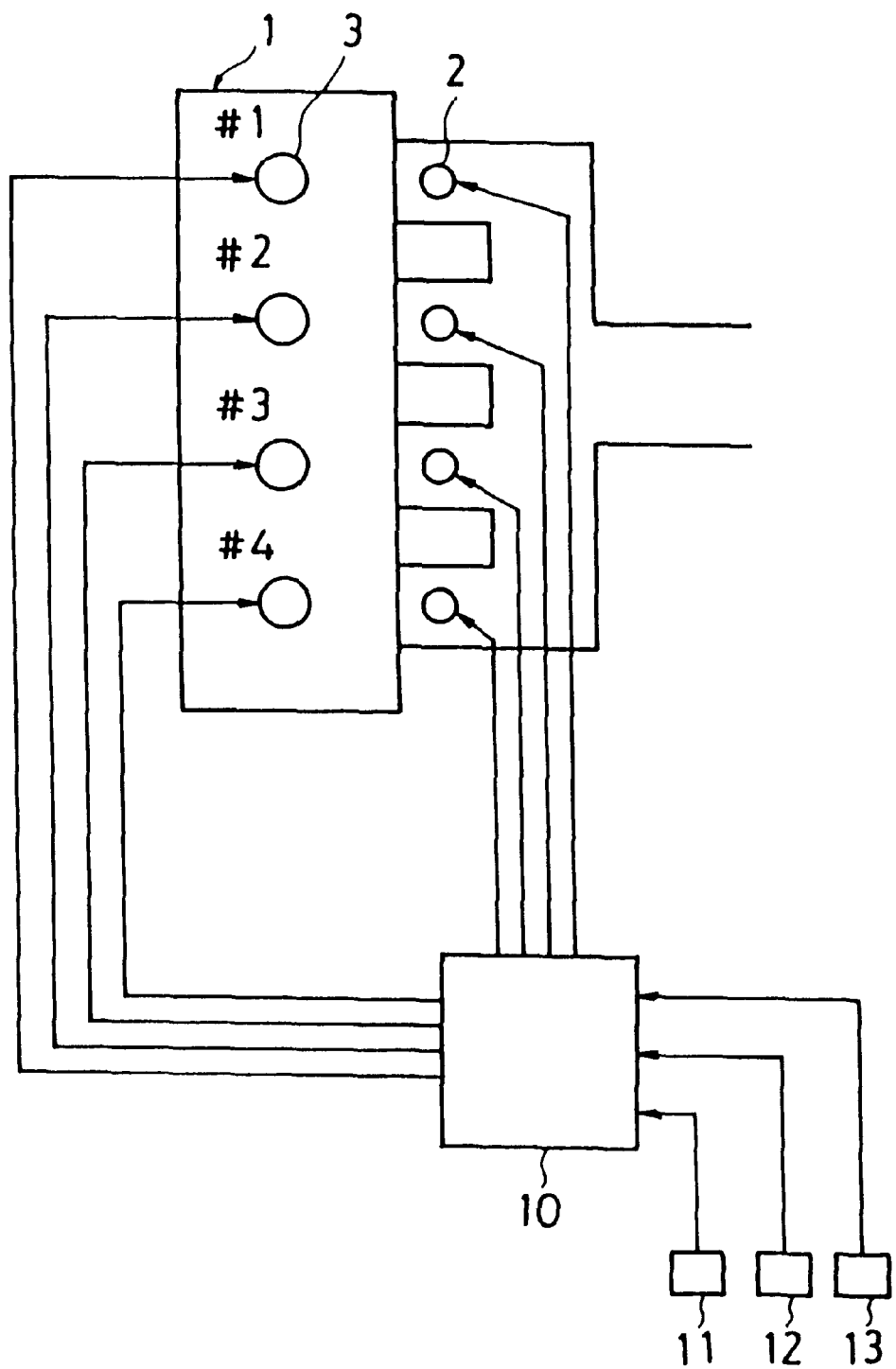
FIG. 2 is a systematic diagram showing one embodiment according to the present invention.

In FIG. 2 and subsequent figures which show one embodiment, there is provided an internal combustion engine 1 having four cylinders, in which the ignition is effected in a sequence of #1→#3→#4→#4.

A control unit 10 which has a microcomputer therein and performs a calculation processing based on signals from various sensors, to thereby control the operations of fuel injection valves 2 and ignition coils 3 provided for each of the cylinders (#1 to #4) of the engine, respectively.

As the various sensors, there are provided such as a crank angle sensor 11, air flow meter 12, and the like.

The crank angle sensor 11 outputs a reference signal for each crank angle 180°, and a unit signal for each unit crank angle (1° to 2°), whereby a crank angle can be detected and an engine rotation speed N can be detected. Included in the reference signal is a cylinder discrimination signal, such as by widening the pulse width of the reference signal such as corresponding to the #1 cylinder, so that the cylinder discrimination can be effected.

The air flow meter 12 is such as of hot wire type adapted to detect an intake air quantity Q.

The control unit 10 conducts the fuel injection by calculating a basic fuel injection quantity $T_P = k \cdot Q/N$ (k: constant) based on the intake air quantity Q and the engine rotation speed N, applying various corrections onto the thus calculated injection quantity to thereby determine a final fuel injection quantity $T_f = T_P \cdot COEF$ (COEF: various correction coefficient), and outputting a driving pulse signal having a pulse width corresponding to the $T_f$, to the fuel injection valve 2 of each of the cylinders at a predetermined timing synchronized with the engine rotation.

Further, the control unit 10 determines an ignition timing based on the engine rotation speed N and the basic fuel injection quantity $T_P$, and control the operation of the ignition coils 3 at the determined timing to make an ignition.

Figure 3:
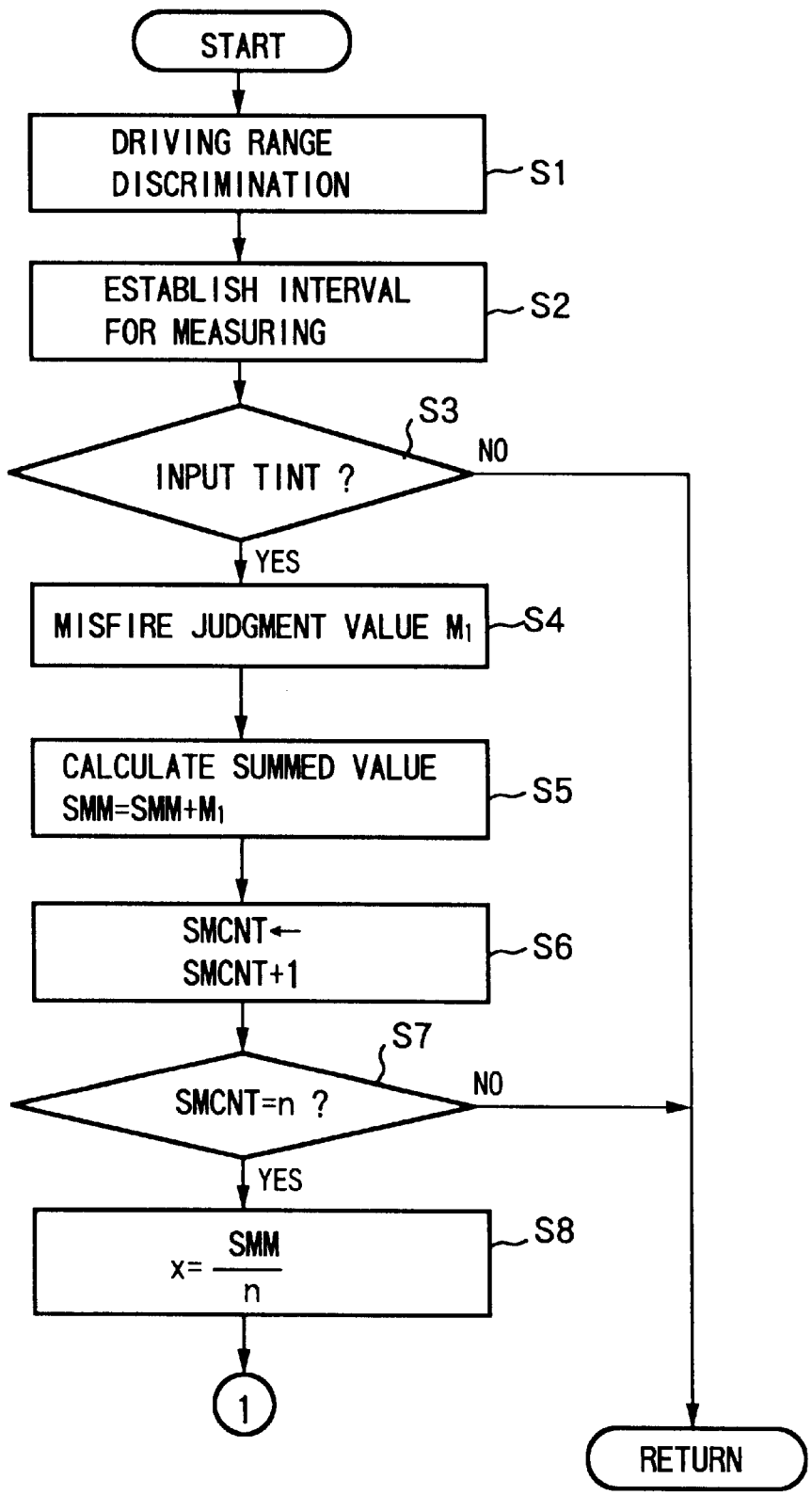
FIG. 3 is a flow chart showing a former part of a misfire diagnosis routine.

The control unit 10 judges presence or absence of misfire in each cylinders in accordance with the routines shown in FIGS. 3 and 4, and issues an alarm such as by an alarm lamp in a predetermined situation.

At step 1 (depicted as "S1" in the figure, and the same rule is applied to hereinafter), it is discriminated as to which of the driving ranges divided based on the engine rotation speed N and basic fuel injection quantity $T_P$, the current driving state belongs to.

At step 2, there are set crank angle intervals to be measured for detecting an angular speed corresponding to the above discriminated driving range. Concretely, the crank angle intervals are set to be narrower in a higher rotational range, since the oscillation in the torsional direction of crank angle is large in such a state so that the difference between the angular "speeds" for misfire and non-misfire is large, and conversely, the crank angle intervals are set to be wider in a lower rotational range, since the oscillation in the torsional direction of crank angle is small in such a state so that the difference between the angular "speeds" for misfire and non-misfire is small.

This routine part corresponds to detection interval setting device.

At step 3, it is judged as to whether each of the periods TINT for the newly set crank angle intervals is input or not. That is, the measurement by timer is started at the starting timing of each of the above set crank angle intervals, and the measured value of the timer is read out at the termination of the crank angle interval to thereby measure TINT. Thus, it is judged whether or not the measured value TINT is input.

The crank angle sensor 11 and the function for measuring TINT collectively correspond to the angular speed detection device.

When TINT is newly input, there is calculated a misfire judgment value $M_1$ corresponding to the applicable cylinder, based on the thus input latest TINT and those TINT's which have been already calculated over several times.

Concretely, the misfire judgment value $M_1$ is calculated by the equation described below, naming the ultimately latest TINT as being T1, based on the recent successive five pieces of values (T1 to T5) which have been obtained in the similar manner. It is noted that T1 represents the current period for the applicable cylinder of misfire judgment which is being cylinder discriminated now, while T5 represents the one cycle preceding period of the same cylinder, in this embodiment.

$$M_1 = [3 \times (T4 - T5) + (T4 - T1)]/T5^3$$

This routine part corresponds to the misfire judgment value calculating device.

At step 5, the misfire judgment value $M_1$ is summed up, by the following equation:

$$SMM = SMM + M_1.$$

This routine part corresponds to the misfire judgment value summing device.

At step 6, there is incremented a value of a counter which counts the summed times.

At step 7, it is judged as to whether the counter value has reached a predetermined number "n".

If the counted value has reached "n", the flow branches to step 8 to calculate an averaged value x=SMM/n, of the summed value SMM.

At step 9, there is calculated a ratio $k = x/x_0$ of the aforementioned averaged value x to a reference value $x_0$ for the summed value. This reference value $x_0$ is obtained from the engine rotation speed N itself at the time of inputting TINT, as a misfire judgment value corresponding to an average TINT value for each cylinder.

At step 10, there is performed a misfire diagnosis, by comparing the ratio k with a reference value. Concretely, when the ratio k<a, the flow branches to step 11 to diagnose that no cylinders are misfiring (non-misfire), when a≦k<b, the flow branches to step 12 to diagnose that a single cylinder is misfiring, and when k>b, the flow branches to step 13 to diagnose that a plurality of cylinders are misfiring.

According to the above, it becomes possible: to detect an angular speed with high accuracy by variably setting crank angle intervals for detecting an angular speed for each of driving ranges of engine, respectively, and to diagnose misfire of a single cylinder and that of a plurality of cylinders, based on the summed value (averaged value of) of the misfire judgment value which is calculated based on a plurality of angular speeds.

The routine part at steps 9 through 13 corresponds to the misfire diagnosis device.

As a misfire judgment value before calculating the summing, the following value $M_2$ can be adopted instead of the aforementioned $M_1$.

$$M_2=[2\times(T3-T5)+(T3-T1)]/T5^3.$$

It is further possible to adopt the following value $M_3$ as the misfire judgment value, by preserving the three pieces of latest values ($M_{21}$ to $M_{23}$) of this $M_2$.

$$M_3=M_{22}-M_{23}.$$

In the above embodiment, the period TINT of the reference signal (i.e., an inverse number of angular speed) has been adopted as the value corresponding to an angular speed. However, it is possible to directly calculate the angular speed (such as by calculating based on the number of inputs of a unit angle signal during a predetermined time).

Further, it is also possible to constitute such that the deviation $\Delta M$ is summed and the summed value is compared with a reference value, in which the deviation $\Delta M$ is the deviation which has a positive value among those deviations [=$M_1$−(averaged value of $M_1$)] of the averaged value of a predetermined number of times of misfire judgment values from the misfire judgment values $M_1$, i.e., the deviation $\Delta M$ is the deviation in case that the TINT is increased due to decrease of angular speed.

What is claimed is:

1. A misfire diagnosis method for an internal combustion engine, comprising the steps of:

detecting an angular speed of rotation for each of predetermined crank angle intervals corresponding to each of cylinders, respectively, detecting an engine driving state to thereby variably set said crank angle intervals for detecting an angular speed, for each of driving ranges corresponding to each of the detected engine driving states, respectively, calculating a misfire judgment value based on a detected value of angular speed for each of predetermined crank angles corresponding to each of cylinders, respectively, summing said misfire judgment value at each calculation, and diagnosing presence or absence of misfire in a manner distinguishing misfire of a single cylinder from that of a plurality of cylinders, by comparing a summed or averaged value of said misfire judgment value with a reference value.

2. A misfire diagnosis method for an internal combustion engine of claim 1, wherein each of said crank angle intervals is variably set such that each of said crank angle intervals is set to be narrower in a higher rotational range, and is set to be wider in a lower rotational range.

3. A misfire diagnosis method for an internal combustion engine of claim 1, wherein detection of said angular speed is performed by detecting each of periods for each of said predetermined crank angle intervals, respectively, as an inverse number of an angular speed corresponding to each of cylinders.

4. A misfire diagnosis apparatus for an internal combustion engine, comprising:

angular speed detecting means for detecting an angular speed of rotation for each of predetermined crank angle intervals corresponding to each of cylinders, respectively, driving state detecting means for detecting an engine driving state, detection interval setting means for variably setting said crank angle intervals for detecting an angular speed, for each of driving ranges corresponding to each of the detected engine driving states, respectively, misfire judgment value calculating means for calculating a misfire judgment value based on a detected value of angular speed for each of predetermined crank angles corresponding to each of cylinders, respectively, misfire judgment value summing means for summing said misfire judgment value at each calculation, and misfire diagnosing means for diagnosing presence or absence of misfire in a manner distinguishing misfire of a single cylinder from that of a plurality of cylinders, by comparing a summed or averaged value of said misfire judgment value with a reference value.

5. A misfire diagnosis apparatus for an internal combustion engine of claim 4, wherein said detection interval setting means variably sets each of said crank angle intervals such that each of said crank angle intervals is set to be narrower in a higher rotational range, and is set to be wider in a lower rotational range.

6. A misfire diagnosis apparatus for an internal combustion engine of claim 4, wherein said angular speed detecting means detects each of periods for each of said predetermined crank angle intervals, respectively, as an inverse number of an angular speed corresponding to each of cylinders.

* * * * *